June 30, 1925.
J. M. BRAUTIGAM
SECTIONAL FOLDING MINNOW TRAP
Filed July 12, 1923
1,544,213
2 Sheets-Sheet 2
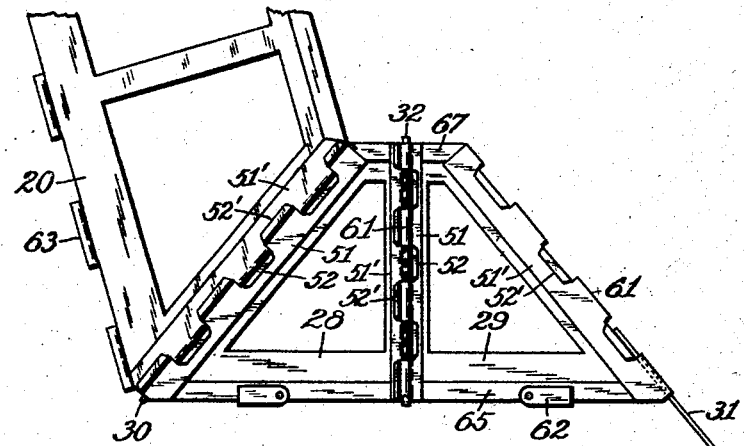
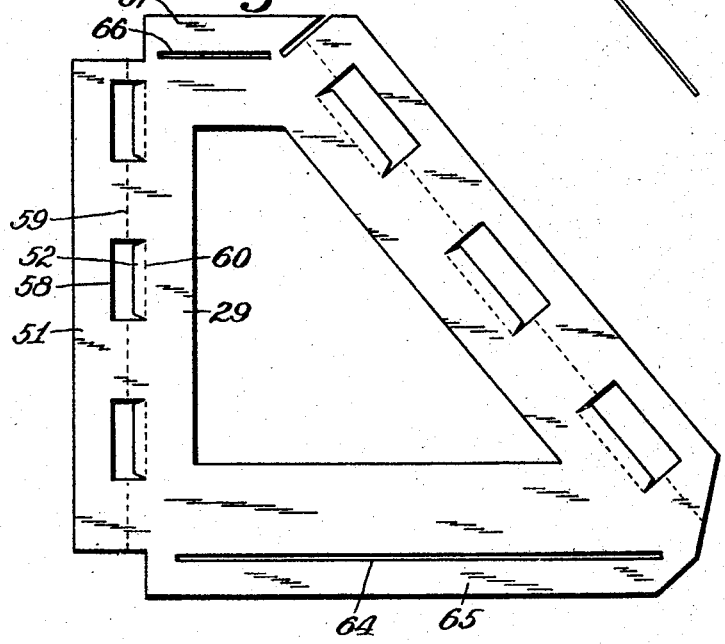
INVENTOR:
John M. Brautigam,
BY
E. T. Silvius,
ATTORNEY.

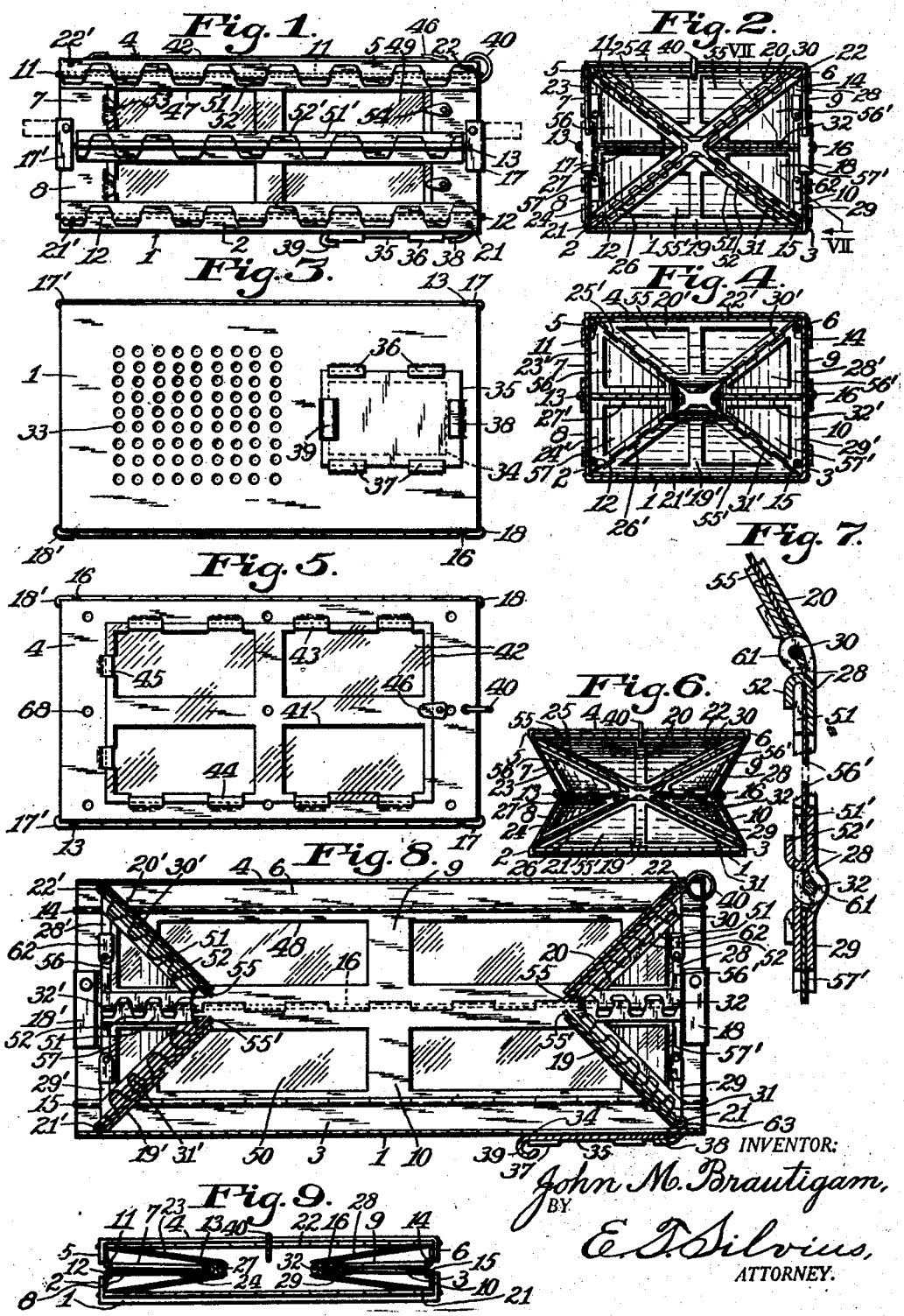

Patented June 30, 1925.

1,544,213

UNITED STATES PATENT OFFICE.

JOHN M. BRAUTIGAM, OF INDIANAPOLIS, INDIANA.

SECTIONAL FOLDING MINNOW TRAP.

Application filed July 12, 1923. Serial No. 651,016.

*To all whom it may concern:*

Be it known that I, JOHN M. BRAUTIGAM, a citizen of the United States, residing at Indianapolis, in the county of Marion and State of Indiana, have invented a new and useful Sectional Folding Minnow Trap, of which the following is a specification, reference being had to the accompanying drawings, and to the letters and figures of reference marked thereon.

This invention relates to an article that is designed to be used by fishermen for catching and retaining minnows to be used for baiting fish hooks, the invention having reference more particularly to a folding minnow-trap of light weight construction which may be conveniently carried by the user.

An object of the invention is to provide a folding minnow-trap which shall be so constructed as to be collapsible and adapted to be folded compactly and flatly so as to be readily carried by hand or in a pocket, or conveniently stowed or packed in a motor vehicle when on a fishing trip.

Another object is to provide a light weight and efficient minnow-trap in which the minnows may be readily seen to enable the fisherman or angler to select and remove the particular size of minnows that may be desired for use as bait.

A further object is to provide an improved folding minnow-trap which shall be of such construction as to permit repairs to be readily made in case of damage thereto that might be caused by accident or rough usage, and which shall have all parts thereof connected together, and as far as possible without soldering or riveting, without liability of careless misplacement of parts during use or folding operations.

A still further object is to provide a light weight folding minnow-trap which shall be composed of readily renewable parts which may be desirable in making repairs that might be necessary because of accidental damage, which trap shall be durable and economical in use.

With the above-mentioned and other objects in view, the invention consists in a minnow-trap composed of novel parts connected together in a novel manner and foldable in an improved manner so as to be compact; and, the invention consists also further in the improved parts comprised in the structure, and in the combinations and arrangements of parts, as hereinafter particularly described and further defined in the claims appended hereto.

Referring to the drawings,—Figure 1 is a side elevation of the improved minnow-trap as preferably constructed; Fig. 2 is an end view of the trap; Fig. 3 is a bottom plan of the trap; Fig. 4 is a transverse section of the trap; Fig. 5 is a top plan of the trap as preferably constructed; Fig. 6 is an end view showing the configuration when the trap is partially folded; Fig. 7 is a fragmentary section approximately on the line VII—VII in Fig. 2 on an enlarged scale; Fig. 8 is a longitudinal vertical central section of the trap; Fig. 9 is an outline view of one of the traps to illustrate the arrangement of parts when the trap is folded; Fig. 10 is a fragmentary plan showing several parts foldably connected together; and, Fig. 11 is a plan of one of the blanks to be folded and formed into one of the sections of the trap.

Similar reference characters in the different figures of the drawing indicate corresponding elements or features of construction herein referred to in detail.

Constructed in accordance with the invention, the minnow-trap is of light weight and composed principally of thin sheet metal, such as commercial tin plate, sheet zinc, or sheet aluminum composition, and is oblong, the trap having a bottom 1 that has upturned flanges 2 and 3 constituting side members, and a top 4 having downturned flanges 5 and 6 constituting side members, the bottom and the top being substantially alike as to size and contour. One side of the trap is composed of two sections or panels 7 and 8 and the opposite side is composed of similar sections or panels 9 and 10. The sections of each side are arranged one above the other and the upper section is hingedly connected, as by a hinge rod 11 with the side member 5, the other section being likewise connected with the side member 2, as by a hinge rod 12, the hinge rods 11 and 12 being arranged on a plane at the inner side of the sections which are hingedly connected together as by means of a hinge rod 13 which is arranged on the outer side of the plane of the sections, so that the sections may be readily folded inwardly. The opposite side sections 9 and 10 are similarly connected as by means of hinge rods 14 and 15 to the side members 6 and 3 respectively and are connected together as by means of a hinge rod 16, the sections of the side being foldable inwardly. One side preferably is prevented from being folded by means of clasps 17 and 17′ embracing the ends respectively of the sections, the opposite side being provided with similar clasps 18 and 18′, each clasp preferably being pivoted to one of the sections. This constitutes the body portion of the trap, and the hinge-like connections may be variously constructed to permit the sides thereof to fold inwardly to bring the top and the bottom each towards the other.

The minnow-trap has two ends that are designed to guide a swimming fish commonly known as minnows into the minnow-trap and afford obstructions to their return therefrom, the ends being approximately funnel-shaped. Each end being sectional and foldable, one end comprises lower and upper sections 19 and 20 connected to the bottom and the top by means of hinge rods 21 and 22 respectively, the sections extending inwardly and convergently each towards the other; the end comprising also two side sections 23 and 24 hingedly connected to the upper and lower sections by hinge devices 25 and 26 respectively permitting the side sections to fold over onto the upper and lower sections respectively, the two side sections being hingedly connected together by means of a hinge device 27 permitting the two sections to be folded over each against the other. The opposite side of the end comprises two sections 28 and 29 connected to the upper and lower end sections by means of hinge devices 30 and 31 respectively, being connected together by a hinge device 32. The hinge rods of the devices 27 and 32 lie within the minnow-trap and the others on the outer side thereof. The opposite end similarly comprises lower and upper sections 19′ and 20′, having the hinge devices 21′ and 22′, side sections 23′ and 24′ having the hinge devices 25′ and 26′ and also the hinge device 27′, the opposite side comprising sections 28′ and 29′ having the hinge devices 30′ and 31′ and also the hinge device 32′. Each end section is approximately triangular and one of the smaller portions of each section is located nearly at the middle of the end which has a central opening of suitable dimensions for the passage of water and minnows.

Preferably the bottom 1 of the minnow-trap is suitably made reticulate as by means of perforations 33, for the passage of water, and the bottom has a doorway 34 covered by a slide door 35 guided in suitable guides 36 and 37 which may be made integral with the bottom by cutting slits at the edges of the doorway and pressing up portions of the metal, a stop 38 for the door being likewise provided, the door having a suitable handle 39.

The forward end of the top 4 is provided with a ring or link 40 to which an anchor chain or rope may be connected for holding the forward end of the minnow-trap so as to face up-stream or against the current of the water. Preferably the top 4 has a suitable number of window openings 41 therein that are covered by a sheet 42 of transparent substance, such as celluloid, the sheet being removably held in place by means of guides 43 at one edge and other guides 44 at the opposite edge of the window opening, and also stops 45 at one end of the window opening and a button 46 at the opposite end thereof, the guides and the stops preferably being integral with the metal of the top, to avoid the cost of soldering or riveting the guides in place.

The sections of the sides of the minnow-trap preferably are also provided with window openings 47 and 48 respectively that are covered by transparent sheets 49 and 50 respectively, each sheet being removably held in place by means of guide plates 51 and 51′ formed integrally with the metal of the sections bent over hinge rods to form hinge ears to permit the side sections to be folded, other portions of the metal being bent over upon the guide plates to constitute clamps 52 and 52′ respectively. The transparent sheets are further held in place by means of stops 53 at one end and buttons 54 at the opposite end thereof. The windows are designed to admit light into the minnow-trap.

Preferably further provision is made for admitting light into the minnow-trap, the upper and lower sections of each end being provided with transparent sheets 55 and 55′, the sections of one side having transparent sheets 56 and 57 respectively and the sections of the opposite side having similar sheets 56′ and 57′ respectively.

In Fig. 10 the devices for holding the transparent sheets are represented as being on the opposite side of the sections from those in the preceding figures in which the sheets are externally arranged. When each section is flat, portions being unfolded as shown in Fig. 11 the marginal portions of the section have apertures 58 therein and the marginal portions are to be bent over on lines 59 to constitute hinge connections that support said guide plates 51, said clamps 52 extending into the apertures and being subsequently bent over on lines 60 to securely hold the guide plates in place, hinge ears 61 receiving hinge rods 30, 31, 32. Preferably clasps 62 are pivoted to the end sections for retaining the transparent plates in place under the guides. The upper and lower end sections have hinge ears 63 that are connected by means of the hinge rods to similar ears which may be formed integral with the bottom and the top of the minnow-trap.

When an end section is flat as in Fig. 11, before receiving the bending operations, one marginal portion preferably has a slot 64 therein that provides a strip that is folded over on the line of the slot to constitute a clamp plate 65 to assist in holding the transparent sheet, the opposite portion having a slot 66 permitting the marginal portion to be bent over to form a clamp plate 67, the slots permitting the transparent sheets to pass through the edge portion of the section. The inner end of each transparent sheet on the end sections extends beyond the smaller end of the section, or through the slot 66, and the projecting portion being thin and flexible permits a fish to pass inward but offers an obstruction to the fish in an attempt to pass out of the minnow-trap. The upper end preferably has a slightly smaller central opening than the opposite end, so that the minnows swimming up stream can easily enter the minnow-trap but those of desirable size cannot pass through the upper end. Preferably the top 4 has suitable perforations 68 for the passage of water through the trap.

In practical use, the minnow-trap is placed in water where there are minnows which swim into the minnow-trap through the larger opening in the end that is down stream and they swim towards the upper end which admits water through its central opening but ordinarily prevents the minnows from swimming out through the end. The door 35 may be opened by the fisherman who will select the desired size of minnows for bait. When the minnow-trap is not needed for catching bait the clasps, 17, 18 are withdrawn from place to permit the sections of the sides to fold inwardly, the sections of the ends automatically folding inwardly also, so that the structure collapses until the bottom and the top are drawn sufficiently close together to form a relatively thin package which may be easily carried or stowed away for future use. The smaller size of minnow-traps when folded may be readily carried in a garment pocket. When the minnow-trap is required for use it is quickly unfolded and the clasps returned to place to hold the side sections in normal position, the ends being automatically unfolded so as to be normal.

What I claim as new is:—

1. A sectional folding minnow-trap including a bottom and a top, two sectional ends hingedly connected to the bottom and the top and foldable inward between them, and two sectional sides hingedly connected to the bottom and the top and foldable partially into the folded ends.

2. A sectional folding minnow-trap including a bottom and a top, two sectional ends hingedly connected to the bottom and the top and foldable inward between them, one of the ends having an opening therein provided with a movable obstruction, and two sectional sides hingedly connected to the bottom and the top and foldable partially into the folded ends.

3. A sectional folding minnow-trap including a bottom and a top having each a pair of side members integral therewith, two sides comprising each a pair of sections hinged together and to the side members on the bottom and the top respectively, and two ends comprising each a pair of sections hinged to the bottom and the top and two sectional folding sides foldably connected to the hinged sections.

4. A sectional folding minnow-trap including a bottom and a top, two sides comprising each two sections hingedly connected together, and also to the bottom and the top respectively to fold inwardly, clasps removably connected to the ends of the sides normally preventing folding thereof, and two sectional foldable ends hingedly connected to the bottom and the top to fold inward and between the bottom and the top.

5. A sectional folding minnow-trap including a bottom and a top, two sides comprising each a pair of sections hingedly connected together and the sections of the pair hinged to the bottom and the top respectively, two lower end sections hinged to the bottom, two upper end sections hinged to the top, two pairs of foldable end sections hinged to one of the lower end sections and to one of the upper end sections, and two pairs of foldable sections hinged to the remaining lower end section and to the remaining upper end section.

6. A sectional folding minnow-trap including a bottom and a top, folding sides comprising sections having window openings and folding ends comprising sections having window openings, the sections having portions thereof on opposite sides of the openings bent over towards the openings to constitute hinge ears and also guide plates and other portions bent over upon and clamping the plates to the bodies of the sections, the guide plates extending from the ears towards the openings, transparent sheets on the sections respectively and engaged by the guide plates, and hinge rods arranged in said ears.

7. A sectional folding minnow-trap comprising a perforated bottom having a doorway, a door slidably guided on the bottom and normally closing the doorway, a top having a window therein, two sides composed each of two sections hingedly connected together and also hinged respectively to the bottom and the top and having a window therein, and two ends composed each of four triangular sections hingedly connected together and having each a window therein, one of the sections of each of the ends having a hinging connection with the bottom and the opposite one of the sections having a hinging connection with said top.

8. A sectional folding minnor-trap including a bottom and a top having each a pair of side members integral therewith two foldable sides foldably connected to the bottom and the top, and two ends comprising each a plurality of triangular sections foldably connected together, two of the triangular sections being hinged to the bottom and the top respectively and extending convergently each towards the other, the remaining triangular sections forming two pairs extending convergently each towards the other from the foldable sides respectively, there being a central opening in each of the ends, and means to engage the parts of the foldable sides to normally prevent folding thereof.

9. A sectional folding minnow-trap including a body part comprising a bottom having upturned side members thereon, a top having downward-extending side members thereon, two lower side sections hinged to said upturned side members respectively, two upper side sections hinged to the downward-extending side members respectively and to the lower side sections respectively, and two ends comprising each a lower triangular section hinged to the body part bottom, an upper triangular section hinged to the body part top, two triangular sections hingedly connected together and also hinged respectively to one edge of the lower triangular section and to one edge of the upper triangular section, and two triangular sections hingedly connected together and also hinged respectively to the opposite edge of the lower triangular section and to the opposite edge of the upper triangular section.

10. A sectional folding minnow-trap including a perforated bottom and a top having each a pair of side members integral therewith, the top having a window, folding sides each comprising sections hinged together and to the side members of the bottom and the top respectively, the sections having window openings, the sections having portions thereof on opposite sides of the openings bent over towards the openings to constitue hinge ears and also guide plates and other portions bent over upon and clamping the plates to the bodies of the sections, the guide plates extending from the ears towards the openings, transparent sheets on the sections respectively to cover the openings and engaged by the guide plates, hinge rods arranged in said ears, and sectional folding ends hinged to the bottom and the top and having central openings.

In testimony whereof, I affix my signature on the 30th day of June, 1923.

JOHN M. BRAUTIGAM.